(12) United States Patent
Josten et al.

(10) Patent No.: US 7,146,364 B1
(45) Date of Patent: Dec. 5, 2006

(54) METHOD AND SYSTEM FOR RECOVERING DATA IN A PLURALITY OF SYSTEMS

(75) Inventors: Jeff W. Josten, San Jose, CA (US); Christopher J. Munson, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 09/705,967

(22) Filed: Nov. 3, 2000

(51) Int. Cl.
*G06F 17/30* (2006.01)

(52) U.S. Cl. .......................... 707/8; 711/152; 710/200; 710/201; 710/202; 710/203; 710/204

(58) Field of Classification Search .................. 707/8, 707/1, 10, 200–204; 710/200–204; 711/152
See application file for complete search history.

(56) References Cited

U.S. PATENT DOCUMENTS

| | | | | |
|---|---|---|---|---|
| 4,480,304 A | * | 10/1984 | Carr et al. ................ | 710/200 |
| 4,608,688 A | | 8/1986 | Hansen et al. | |
| 4,618,779 A | | 10/1986 | Wiscombe | |
| 5,287,501 A | * | 2/1994 | Lomet ..................... | 707/202 |
| 5,327,556 A | * | 7/1994 | Mohan et al. ............ | 707/8 |
| 5,333,303 A | * | 7/1994 | Mohan ..................... | 714/20 |
| 5,339,427 A | | 8/1994 | Elko et al. | |
| 5,574,902 A | * | 11/1996 | Josten et al. ............. | 707/1 |
| 5,752,026 A | * | 5/1998 | Fortier ................... | 707/103 R |
| 5,758,356 A | * | 5/1998 | Hara et al. .............. | 707/202 |
| 5,850,507 A | | 12/1998 | Ngai et al. | |
| 5,920,872 A | | 7/1999 | Grewell et al. | |
| 5,940,841 A | | 8/1999 | Schmuck et al. | |
| 5,966,706 A | * | 10/1999 | Biliris et al. ............ | 707/10 |
| 6,185,699 B1 | * | 2/2001 | Haderle et al. .......... | 714/19 |
| 6,226,651 B1 | * | 5/2001 | Masuda et al. .......... | 707/202 |
| 6,275,832 B1 | * | 8/2001 | Watts et al. .............. | 707/203 |
| 6,449,623 B1 | * | 9/2002 | Bohannon et al. ....... | 707/202 |

* cited by examiner

*Primary Examiner*—Sathyanarayan Pannala
(74) *Attorney, Agent, or Firm*—Sawyer Law Group LLP

(57) ABSTRACT

In a first aspect of the present invention, a method for recovering data in a plurality of systems is disclosed. The method comprises the steps of allowing at least one system of the plurality of systems to fail, retaining a plurality of locks of the at least one system and restarting the at least one system utilizing minimal resources. In a second aspect of the present invention, a system for recovering data in a plurality of computer systems is disclosed. The system comprises means for allowing at least one computer system of the plurality of computer systems to fail, means for retaining a plurality of locks of the at least one computer system and means for restarting the at least one computer system utilizing minimal resources. According to the present invention, the method and system for recovering retained locks in a plurality of systems recovers the data being protected by the retained locks of a failed system quickly and with minimal system disruption.

15 Claims, 2 Drawing Sheets

METHOD AND SYSTEM FOR RECOVERING DATA IN A PLURALITY OF SYSTEMS

FIELD OF INVENTION

The present invention relates generally to computer systems and more specifically to a method and system for recovering data in the event of a system failure.

BACKGROUND OF THE INVENTION

Shared File Systems (SFS) is a term applied to IBM's System/390 (S/390) system for sharing data among virtual machines. IBM's DB2 has been adapted for this type of data sharing in a Multiple Virtual Storage (MVS/Enterprise Systems Architectures (ESA) environment by using IBM's coupling facility to create multi-system data sharing.

In such a shared system, when one of the systems fails, the update mode locks (data locks) that were held at the time of the failure are "retained" to prevent the other systems from accessing inconsistent data (data that had not yet reached a point of consistency at the time of the failure). To remove the retained data locks, the failed system's logs must be read in a forward and a backward direction in order to bring the data back to a point of consistency. Once this has been done, the retained locks can be removed, and the data is again accessible from all the systems.

One conventional method generally employed to remove the retained locks when an operating system fails is the restart/recovery method. Utilizing the restart/recovery method, the failed system is restarted (either manually or automatically) on another operating system in the cluster and recovery logic is used to "recover" the data being protected by the retained data locks and bring the data back to consistency. The trouble with this approach is that in order to restart the failed system, a substantial amount of CPU resources could be utilized. Consequently, this use of CPU resources could impose a significant disruption to the work that is already running on the operating system.

Accordingly, what is needed is a more efficient method and system for recovering the retained locks of the failed operating system. The method and system should be simple, cost effective and capable of being easily adapted to existing technology. The present invention addresses such a need.

SUMMARY OF THE INVENTION

In a first aspect of the present invention, a method for recovering data in a plurality of systems is disclosed. The method comprises the steps of allowing at least one system of the plurality of systems to fail, retaining a plurality of locks of the at least one system and restarting the at least one system utilizing minimal resources.

In a second aspect of the present invention, a system for recovering data in a plurality of computer systems is disclosed. The system comprises means for allowing at least one computer system of the plurality of computer systems to fail, means for retaining a plurality of locks of the at least one computer system and means for restarting the at least one computer system utilizing minimal resources.

According to the present invention, the method and system for recovering retained locks in a plurality of systems recovers the data being protected by the retained locks of a failed system quickly and with minimal system disruption.

DETAILED DESCRIPTION OF THE INVENTION

The present invention provides a method and system for recovering data in a plurality of systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention is disclosed in the context of a preferred embodiment. The preferred embodiment of the present invention provides a method and system for recovering data in a shared data system. In accordance with the present invention, minimal resources are utilized to restart and recover the retained data locks of a failed system. Accordingly, the retained data locks of the failed system are recovered quickly and with minimal system disruption.

Figure 1:
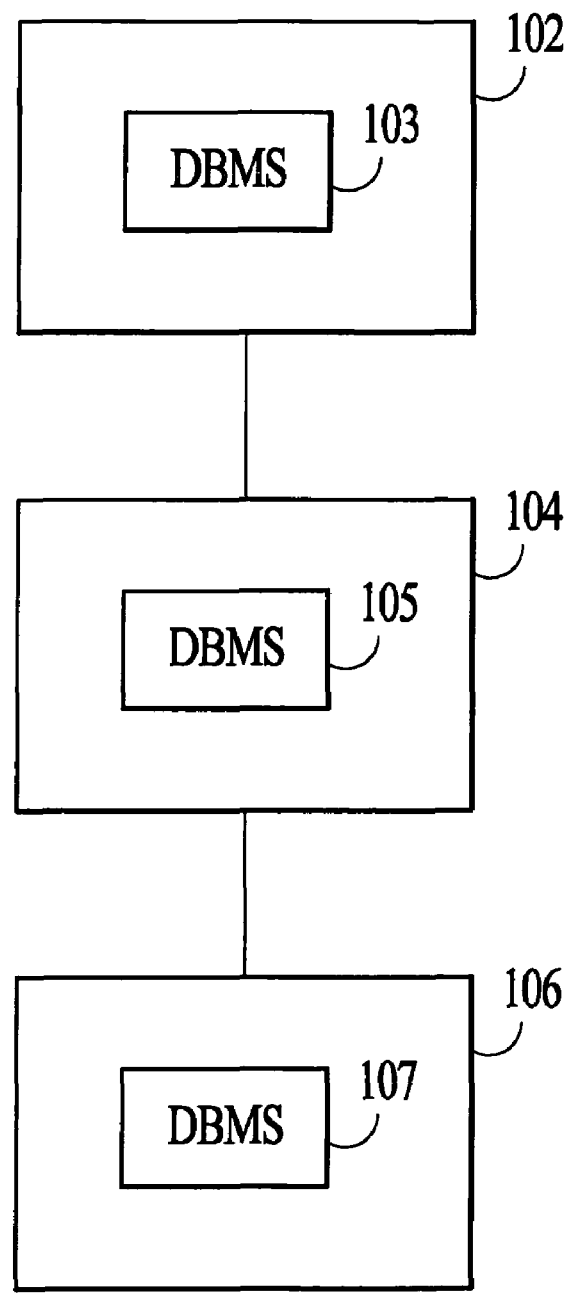
FIG. 1 is an example of a system in which the present invention could be implemented.

For a further description of the present invention, please refer now to FIG. 1. FIG. 1 is an example of a system 100 in which the present invention could be implemented. The system 100 comprises a plurality of operating systems 102, 104, 106 wherein each of the plurality of operating systems 102, 104, 106 includes a database management system (DBMS) 103, 105, 107 wherein each of the DBMSs 103, 105, 107 are logically grouped together and operate in tandem with one another. An example of such a system is an IBM S/390 system and DB2 for OS/390 Data Sharing.

In accordance with the present invention a new mode of restarting a failed DBMS is introduced. This new mode ("restart light" mode) preferably specifies that only minimal resources are utilized to perform the restart/recovery process of a failed DBMS. By utilizing minimal resources, the restart/recovery process can be performed quickly and once the data being protected by the retained data locks has been recovered and the data is brought back to consistency, the failed DBMS immediately shuts down in a normal fashion without accepting any new work.

In accordance with the present invention, minimal resources are a predefined plurality of resources that are necessary only for the performance of a restart/recovery process for the failed DBMS. Since the recovery of the data being protected by the retained data locks is the only task that is being performed, any resource that does not facilitate the accomplishment of this task is not needed. For example, a resource that is utilized to enable the failed DBMS to accept new work is not necessary for the performance of the restart/recovery process and is therefore not a minimal resource. The utilization of minimal resources to perform the restart/recovery process serves to significantly reduce the amount of CPU and storage that is required to perform the process and it also reduces the processing time required to recover the data being protected by the retained data locks. Furthermore, by reducing the CPU and storage requirements, the restart/recovery process can be performed with minimal disruption to the work that is already running on the system.

Figure 2:
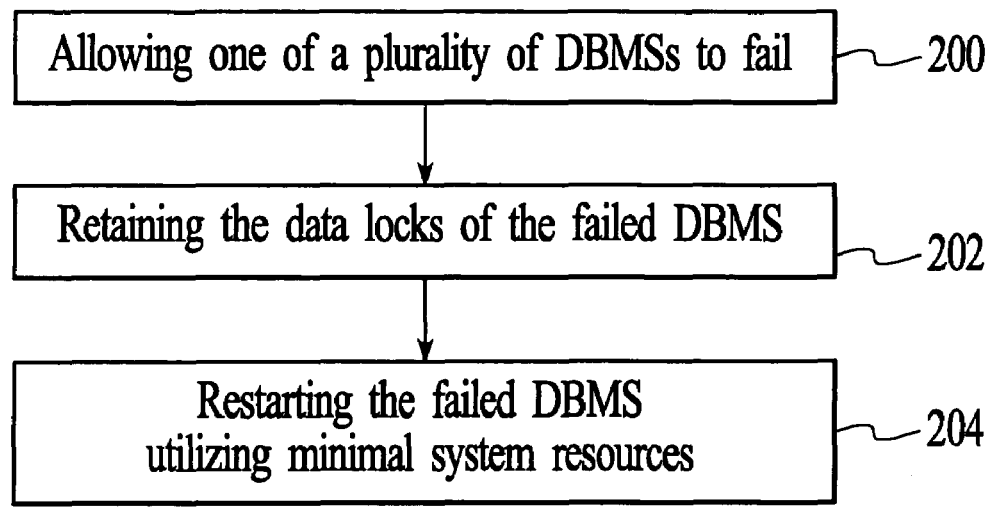
FIG. 2 is a flowchart of the method in accordance with the present invention.

For a better understanding of the method in accordance with the present invention, please refer now to FIG. 2. FIG. 2 is a flowchart of the method in accordance with the present invention. In a system comprising a cluster of operating systems wherein each operating system includes a DBMS, the method begins with the abnormal termination (failure) of one of the DBMSs, via step 200. Next, the data locks of the failed DBMS are retained, via step 202. Preferably, the locks are retained by another operating system within the cluster of operating systems. Finally, the failed DBMS is restarted utilizing minimal system resources, via step 204.

Figure 3:
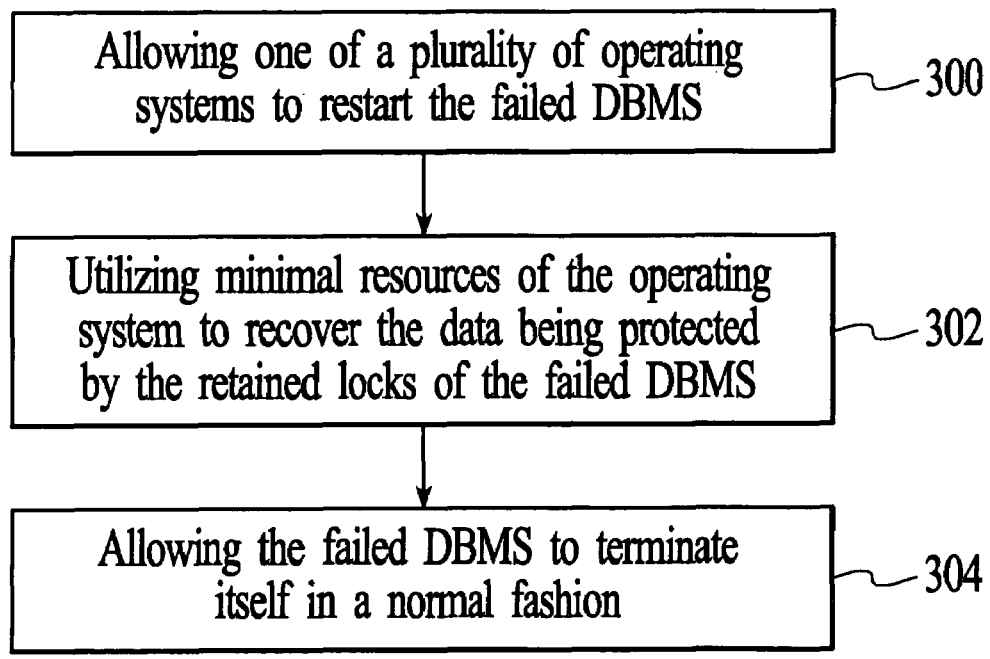
FIG. 3 is a detailed description of step 204 of the flowchart of FIG. 2.

For a more detailed understanding of the present invention, please refer now to FIG. 3. FIG. 3 is a detailed description of step 204 of the flowchart of FIG. 2. First, an operating system other than the operating system of the failed DBMS is allowed to restart the failed DBMS, via step 300. Preferably, the operating system restarts the failed DBMS in "restart light" mode after receiving a request to restart the failed DBMS in "restart light" mode. This request is preferably made manually or automatically via computer software. Next, minimal resources of the operating system are utilized to recover the data being protected by the retained locks of the failed DBMS, via step 302. Finally, once the data being protected by the retained locks has been recovered and brought back to consistency, the failed DBMS terminates itself in a normal fashion, via step 304. Preferably, steps 300–304 are performed wherein the failed DBMS does not accept any new work. Once the data being protected by the retained data locks is released and brought back to consistency, full lock granting protocols are restored throughout the system.

Although the preferred embodiment of the present invention is disclosed in the context of being utilized in conjunction with an IBM S/390 system, one of ordinary skill in the art will readily recognize that the present invention could be utilized in conjunction with a variety of systems while remaining within the spirit and scope of the present invention.

Such a method may also be implemented, for example, by operating the system 100 to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for recovering retained locks in a plurality of systems.

This computer readable media may comprise, for example, RAM (not shown) contained within the system 100. Alternatively, the instructions may be contained in another computer readable media such as a magnetic data storage diskette and directly or indirectly accessed by the system 100. Whether contained in the system 100 or elsewhere, the instructions may be stored on a variety of machine readable storage media, such as a DASD storage (e.g. a conventional "hard drive" or a RAID array), magnetic tape, electronic read-only memory (e.g., ROM, CD-ROM, EPROM, or EEPROM), an optical storage device (e.g., CD ROM, WORM, DVD, digital optical tape). In an illustrative embodiment of the invention, the machine-readable instructions may comprise lines of compiled C, C++, or similar language code commonly used by those skilled in the programming for this type of application arts.

Through the use of the present invention, minimal resources are utilized to perform the restart/recovery process of a failed DBMS. The utilization of minimal resources to perform the restart/recovery process serves to significantly reduce the amount of CPU and storage that is required to perform the process and it also reduces the processing time required to recover the retained data locks. Furthermore, by reducing the CPU and storage requirements, the restart/recovery process can be performed with minimal disruption to the work that is already running on the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for recovering retained locks in a shared system environment having a plurality of operating systems sharing processor resources, in which each operating system is running a corresponding database management system (DBMS), the method comprising:
   determining that a first database management system associated with a first operating system has failed, the first operating system being one of the plurality of operating systems;
   retaining within a second operating system a plurality of data locks held by the first database management system in response to the failure, the plurality of data locks being held by the second operating system to prevent other database management systems in the shared system environment from accessing inconsistent data associated with each of the plurality of data locks, the second operating system being one of the plurality of operating systems; and
   restarting the first database management system on the second operating system to recover the inconsistent data, including bringing to consistency the inconsistent data associated with each of the plurality of data locks, the second operating system using a predefined plurality of the processor resources that are necessary to restart the first database management system and recover the inconsistent data.

2. The method of claim 1, wherein the predefined plurality of processor resources does not include a processor resource utilized to enable the first database management system to accept new work.

3. The method of claim 1, wherein the plurality of operating systems sharing processor resources are logically grouped together and operate in tandem with one another.

4. The method of claim 1, further comprising shutting down the first database management system responsive to recovery of the inconsistent data and restoring full lock granting protocols throughout the shared system environment.

5. The method of claim 1, wherein the plurality of data locks comprise a plurality of update mode locks.

6. A system including plurality of processors for recovering retained locks in a shared system environment having a plurality of operating systems sharing processor resources, in which each operating system is running a corresponding database management system (DBMS), the system comprising:
   means for determining that a first database management system associated with a first operating system has failed, the first operating system being one of the plurality of operating systems;

means for retaining within a second operating system a plurality of data locks held by the first database management system in response to the failure, the plurality of data locks being held by the second operating system to prevent other database management systems in the shared system environment from accessing inconsistent data associated with each of the plurality of data locks, the second operating system being one of the plurality of operating systems; and means for restarting the first database management system on the second operating system to recover the inconsistent data, including bringing to consistency the inconsistent data associated with each of the plurality of data locks, the second operating system using a predefined plurality of the processor resources that are necessary to restart the first database management system and recover the inconsistent data.

7. The system of claim 6, wherein the predefined plurality of processor resources does not include a processor resource utilized to enable the first database management system to accept new work.

8. The system of claim 6, wherein the plurality of operating systems sharing processor resources are logically grouped together and operate in tandem with one another.

9. The system of claim 6, further comprising means for shutting down the first database management system responsive to recovery of the inconsistent data and restoring full lock granting protocols throughout the shared environment.

10. The system of claim 6, wherein the plurality of data locks comprise a plurality of update mode locks.

11. A computer readable medium with program instructions tangibly stored thereon for recovering retained locks in a shared system environment having a plurality of operating systems sharing processor resources, in which each operating system is running a corresponding database management system (DBMS), the computer readable medium comprising program instructions for:

determining that a first database management system associated with a first operating system has failed, the first operating system being one of the plurality of operating systems;

retaining within a second operating system a plurality of data locks held by the first database management system in response to the failure, the plurality of data locks being held by the second operating system to prevent other database management systems in the shared system environment from accessing inconsistent data associated with each of the plurality of data locks, the second operating system being one of the plurality of operating systems; and restarting the first database management system on the second operating system to recover the inconsistent data, including bringing to consistency the inconsistent data associated with each of the plurality of data locks, the second operating system using a predefined plurality of the processor resources that are necessary to restart the first database management system and recover the inconsistent data.

12. The computer readable medium of claim 11, wherein the predefined plurality of processor resources does not include a processor resource utilized to enable the first database management system to accept new work.

13. The computer readable medium of claim 11, wherein the plurality of operating systems sharing processor resources are logically grouped together and operate in tandem with one another.

14. The computer readable medium of claim 11, further comprising program instructions for shutting down the first database management system responsive to recovery of the inconsistent data and restoring full lock granting protocols throughout the shared system environment.

15. The computer readable medium of claim 11, wherein the plurality of data locks comprise a plurality of update mode locks.

* * * * *